United States Patent [19]
Nordstrom et al.

[11] Patent Number: 5,505,103
[45] Date of Patent: Apr. 9, 1996

[54] BALL SHIFTER INTEGRATED HOUSING

[75] Inventors: Paul D. Nordstrom, Redford; John J. Berndtson, St. Clair Shores, both of Mich.

[73] Assignees: Dura Mechanical Components, Inc.; Saturn Corp., both of Troy, Mich.

[21] Appl. No.: 248,715

[22] Filed: May 25, 1994

[51] Int. Cl.⁶ .......................... F16H 59/02; F16C 11/06; G05G 9/10
[52] U.S. Cl. .................. 74/473 P; 74/473 R; 403/69; 403/143; 403/329
[58] Field of Search ................ 74/473 R, 473 P; 403/143, 69, 326, 329

[56] References Cited

U.S. PATENT DOCUMENTS

| | | | |
|---|---|---|---|
| 4,333,360 | 6/1982 | Simmons | 74/473 |
| 4,457,188 | 7/1984 | Hauser | 74/473 |
| 4,693,135 | 9/1987 | LaRocca et al. | 74/473 |
| 5,024,117 | 6/1991 | Yamada et al. | 74/473 P |
| 5,213,002 | 5/1993 | Langhof et al. | 74/473 |
| 5,247,848 | 9/1993 | Sabel | 74/473 |

FOREIGN PATENT DOCUMENTS

| | | | |
|---|---|---|---|
| 3341878 | 5/1985 | Germany | 74/473 P |
| 293312 | 8/1991 | Germany | 74/473 P |

*Primary Examiner*—Allan D. Herrmann
*Attorney, Agent, or Firm*—David A. Greenlee

[57] ABSTRACT

A manual transmission shifter, which comprises a ball mounting a shift lever, a lateral shift control arm, and a depending shift control member, is mounted in a plastic shifter housing having a plastic closure plate. The housing has a plurality of spaced integral resilient spring fingers contoured to form a socket for receiving the ball. The fingers are interconnected at their upper ends to define an upper opening for the shift lever. The spring fingers define an opening smaller than the ball diameter at their bottom free ends and flex to receive the ball and contract to snugly embrace the ball. The shift control arm projects through a side slot in the housing to enable up-and-down vertical movement of the control arm from a centered neutral position. An integral spring finger biases the control arm to the neutral position. The closure plate has an annular surface which embraces the bottom ends of the spring fingers to define the size of the socket. The closure plate includes integral locking tangs which snap onto the housing and locking fingers received in grooves on a bellcrank pivot pin to lock the pin to the housing. A separate boot support mounts a shifter boot and includes pins which engage mating holes and grooves on the housing to orient and locate the boot support on the housing. Locking tangs on the boot support snap onto shoulders on the housing. No additional fasteners are used.

18 Claims, 6 Drawing Sheets

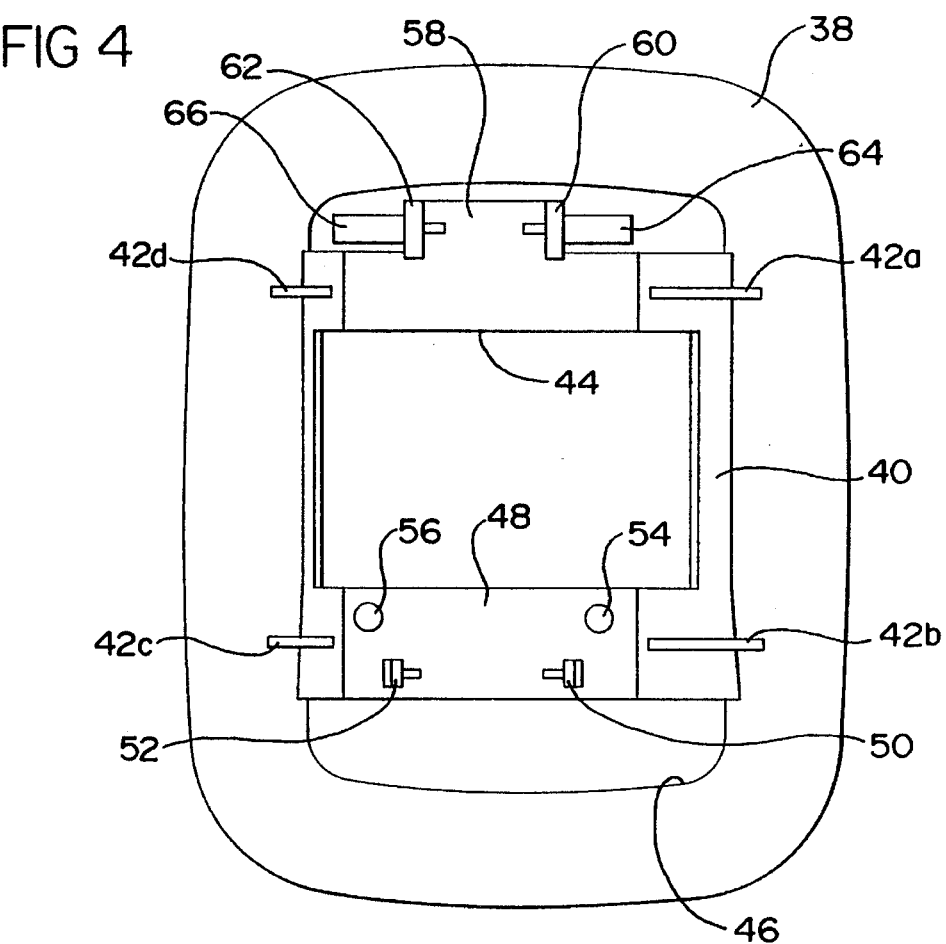

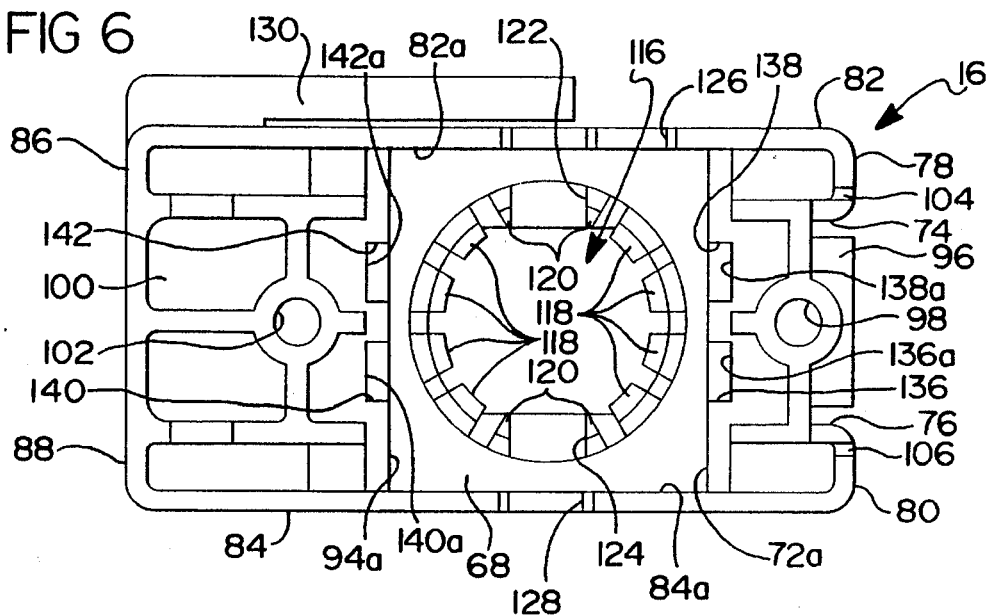
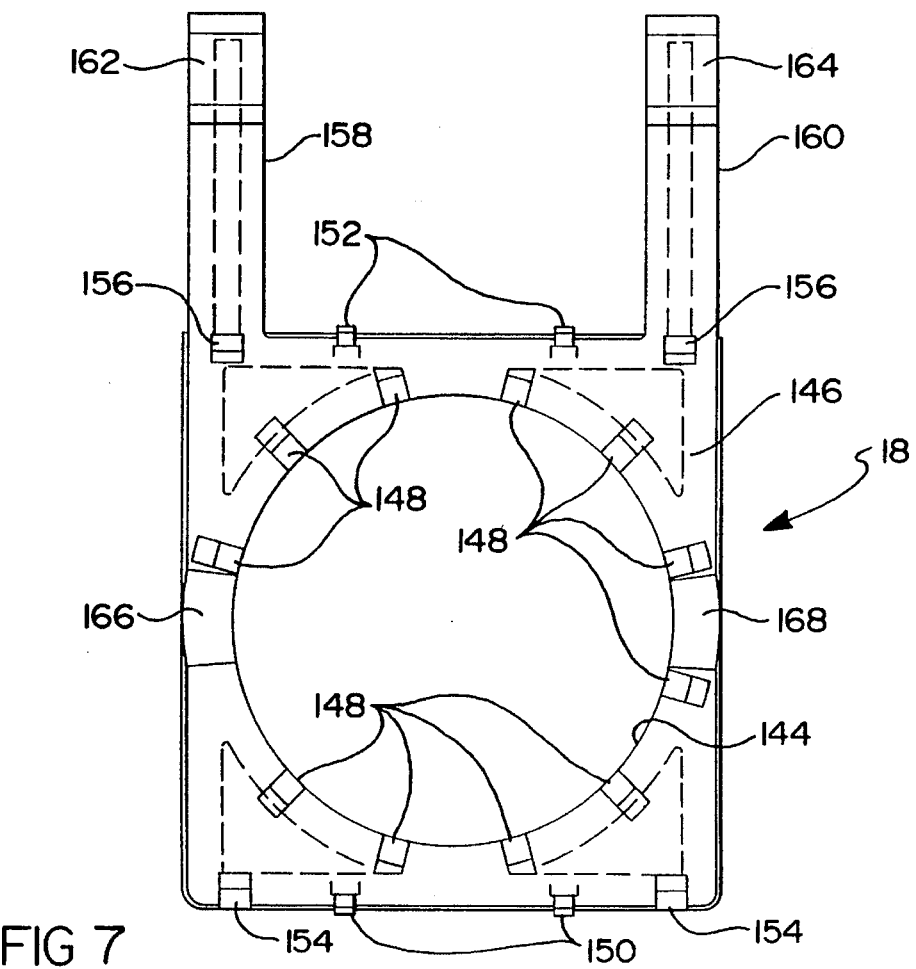

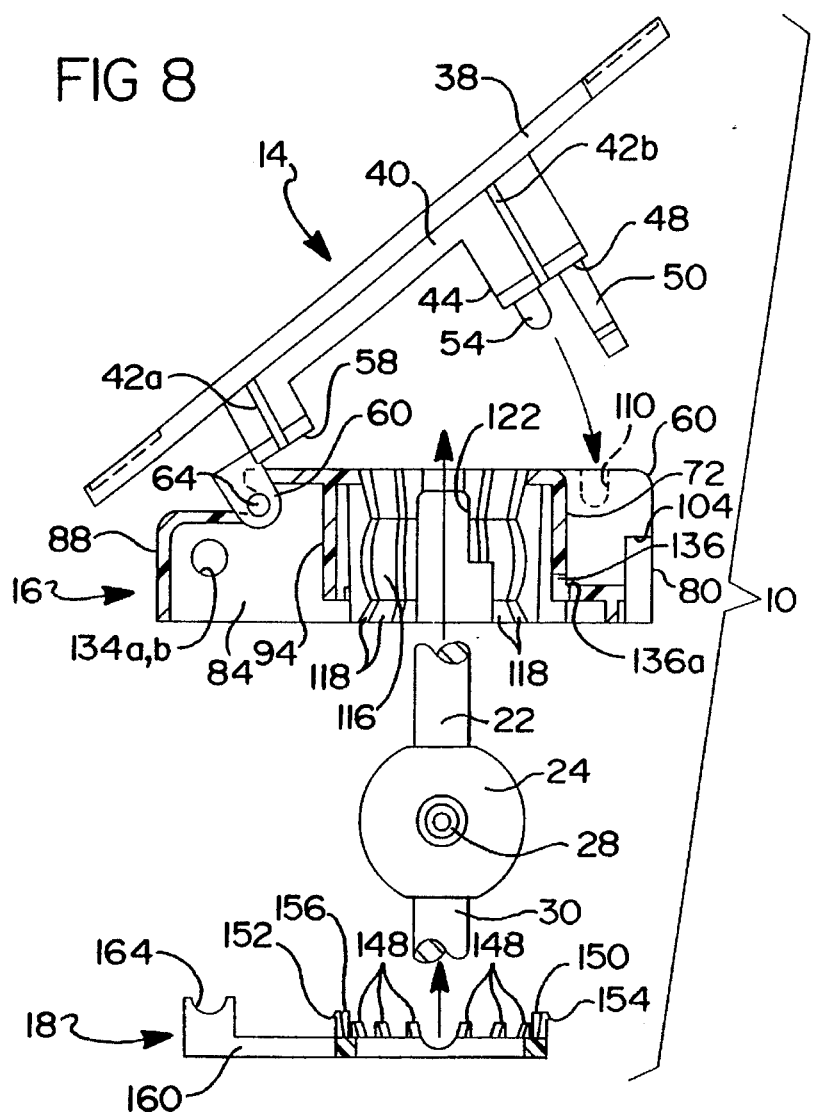

FIG 10
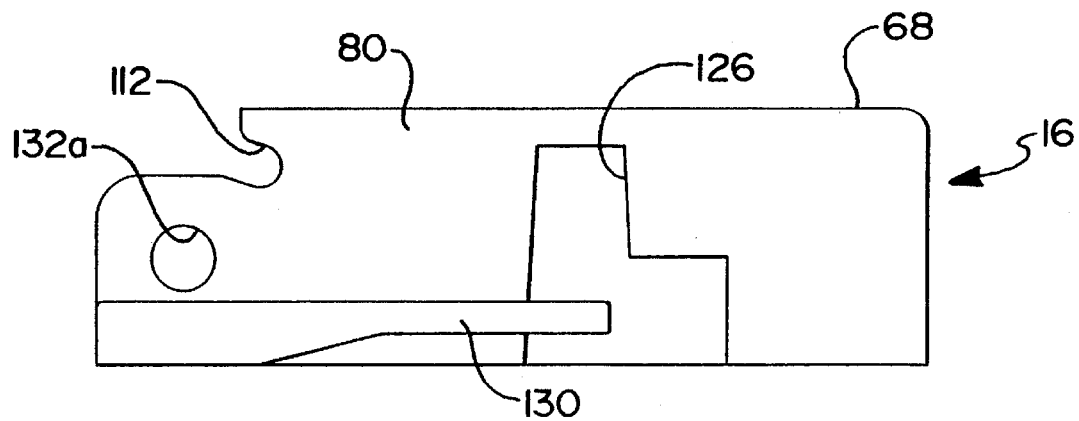
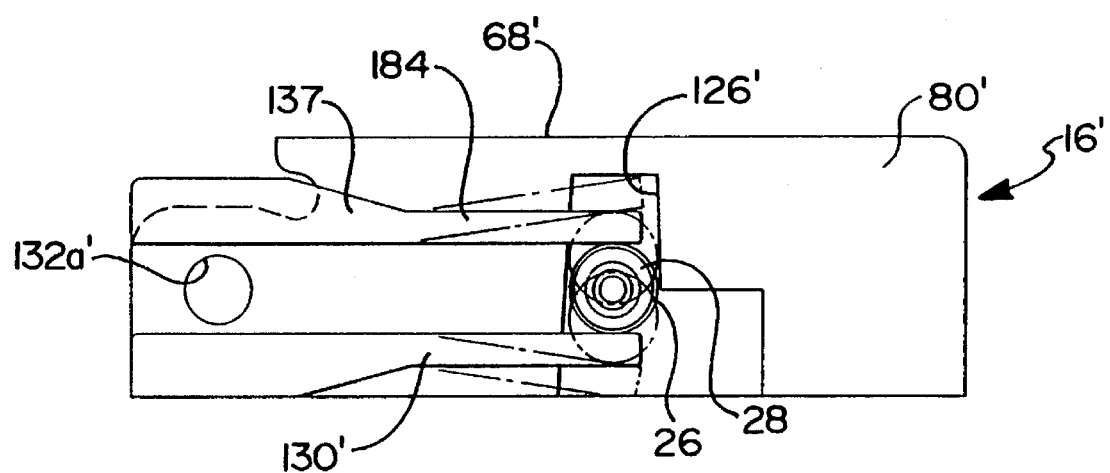
FIG 11

BALL SHIFTER INTEGRATED HOUSING

BACKGROUND OF THE INVENTION

This invention relates generally to manual transmission shifters and, more particularly, to an integrated housing for a ball shifter.

Passenger vehicles equipped with manual transmissions are increasingly supplied with a ball-type cable shifter which mounts the shift lever on a universally movable ball that is mounted in a socket in the shifter housing. This shifter is commonly called a "ball shifter" and is movable about two axes to manipulate cables to shift the transmission. Such a shifter is shown in U.S. Pat. No. 4,693,135—LaRocca, the entire disclosure of which is incorporated herein by reference.

In the LaRocca shifter, one cable is controlled by an extension of the shift lever which extends below the ball. The other cable is controlled by a pin which extends laterally of the ball. The ball is secured in a plastic socket which has a plurality of legs that are expansible to receive the ball. After the ball is in place, the socket is inserted into a mating receptacle in a housing which has a slot to accommodate the shift lever pin. The socket is secured in the housing by a support member which is riveted or bolted to the housing.

A shifter of the LaRocca type is thus composed of a plurality of metal and plastic bits and pieces, all of which require manual assembly. Since each part has a tolerance, tolerance stackup can cause a ball to be tight or loose in its socket. Thus, the same process and design can produce shifters which have a different "feel", since they vary in stiffness or, conversely, in sloppiness. In this situation, tolerance control is extremely important, since these tolerance variations make it difficult to produce a consistently smooth shifter "feel". This adds to manufacture and assembly time and cost.

In this type of shifter, it is desirable to bias the shifter so that, when manually released, it will seek out a centered neutral position. In some shifters, the centering mechanism is located in the vehicle transmission. In some, the transmission will center in one direction only, or not at all. In these cases, a spring must be added to the shifter for centering purposes, adding yet more parts and complexity to the shifter mechanism.

It would be desirable to provide a ball shifter of reduced complexity to simplify and speed assembly.

It would also be desirable to provide a ball shifter which is an integrated assembly that requires fewer parts to reduce assembly time and minimize the effects of tolerance stackup.

It would be further desirable to provide a ball shifter which integrates the spring centering function into the housing structure.

SUMMARY OF THE INVENTION

It is therefore an object of this invention to provide a ball shifter of reduced complexity to simplify and speed assembly.

Another object of this invention is to provide a ball shifter which is an integrated assembly that requires fewer parts to reduce assembly time and minimize the effects of tolerance stackup.

It is a further object of this invention to provide a ball shifter which integrates the spring centering function into the housing structure.

In one aspect, this invention features a manual transmission shifter comprising a shift lever, a ball mounting the lever and having a laterally projecting shift control arm and a depending shift control member, a unitary plastic housing member and a separate closure member. The housing member includes a plurality of integral resilient spring fingers contoured to form a socket for receiving the ball. The fingers are interconnected at their upper ends to define an opening for receiving and enabling shifting movement of the shift lever, and are separable at their bottom ends to enable expansion to receive the ball and contraction thereafter to snugly embrace the ball. The housing member includes a side slot in the housing member for receiving the shift control arm and permitting movement of the control arm in up-and-down directions from a centered neutral position. The closure member is secured to the housing member for engagement with the bottom ends of the spring fingers to prevent expansion thereof, thereby defining the size of the socket.

In another aspect, this invention features a unitary housing member which includes integral spring means engageable with the shift control arm to bias it against movement from the centered neutral position in one or both directions.

In yet another aspect, this invention features integral spring tangs on one of the closure and housing members which are engageable with latch shoulders on the other member to secure the closure member to the housing member.

In still another aspect, this invention features a separate boot support member for mounting a shifter boot. One of the housing and boot support members include a second plurality of spring tangs engageable with second shoulders on the other member to secure the shifter boot member to the housing member.

Preferably, the boot support member includes a pair of spaced lateral mounting pins engageable in mating grooves formed in the housing member to locate the boot support member longitudinally on the housing member and enable relative pivotal closing movement of the members for subsequent engagement of the second plurality of spring tangs with the second latch shoulders to secure the boot support member to the housing member. The boot support member includes a pair of spaced vertically oriented locating pins receivable in mating locating holes formed in the housing member after the members are pivotally closed to laterally orient the members and assure engagement of the spring tangs with the second latch shoulders.

These and further objects and features of this invention will become more readily apparent upon reference to the following detailed description of a preferred and alternative embodiment, as illustrated in the accompanying drawings, in which:

BRIEF DESCRIPTION OF THE DRAWINGS

FIG. 3 is a perspective view of the top of the shifter housing closure according to this invention;

FIG. 4 is a bottom view of the boot support;

FIG. 5 is a top view of the housing;

FIG. 6 is a bottom view of the housing;

FIG. 7 is a top view of the housing closure;

FIGS. 8 and 9 are partially sectioned partial side views of the shifter of FIGS. 1 and 2, illustrating the assembly of the shifter parts;

FIG. 10 is a side view of the shifter housing showing the centering spring finger; and FIG. 11 is a view similar to FIG. 10, but showing another embodiment of the housing which incorporates two integral centering spring fingers and illustrating their operation in centering the shifter control arm.

DETAILED DESCRIPTION OF A PREFERRED EMBODIMENT

Figure 1:
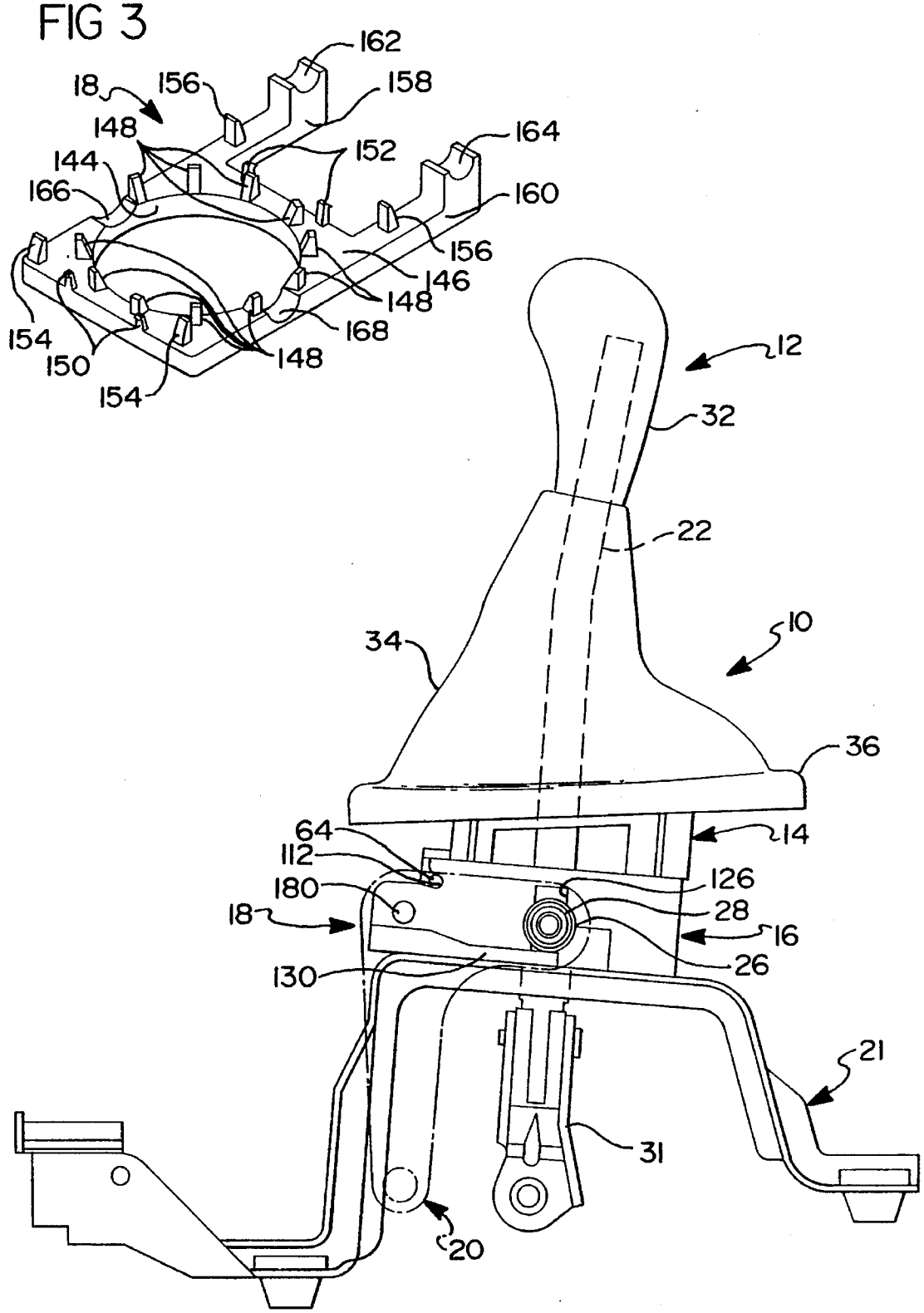
FIG. 1 is a side view of a manual transmission shifter according to this invention.
Figure 2:
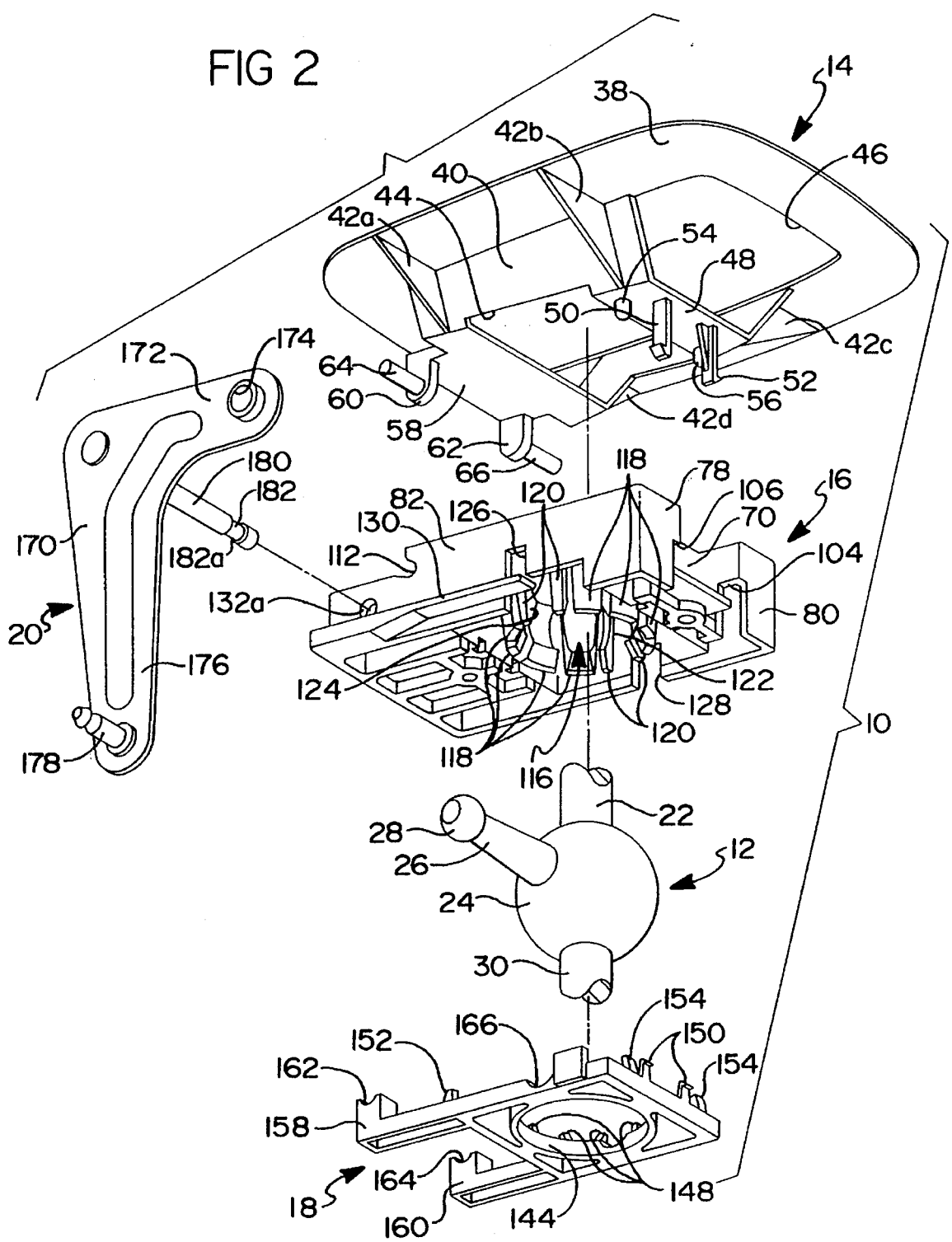
FIG. 2 is an inverted exploded perspective view of the shifter of FIG. 1 illustrating the shifter boot support, housing and housing closure.

Referring now to FIGS. 1 and 2, a vehicle manual transmission shifter assembly 10 comprises a shift lever assembly 12, a boot support 14, a shifter housing 16, a housing closure 18, and a bellcrank 20, all mounted on a mounting base 21. Shift lever assembly 12 includes a steel shift lever 22 which mounts a generally spherical ball 24 adjacent its lower end. A control arm 26 extends perpendicular to shift lever 22 from ball 24 and terminates in ball end 28 which operatively engages bellcrank 20. Shift lever 22 has a depending shift control member 30 that extends below ball 24 and mounts a lever extension or link 31.

Boot support 14 is provided to mount a cosmetic boot. In some shifter assemblies, a shifter boot is not used or is not attached to housing 16. In these instances, a shifter assembly according to this invention will not include boot support 14. However, in the illustrative embodiment disclosed herein, boot support 14 is utilized.

As shown in FIG. 1, shift lever 22 is topped by a conventional shift knob 32 which engages the upper end of a conventional flexible boot 34. The bottom skirt 36 of boot 34 embraces mounting flange 38 of boot support 14. Boot support 14 is a single piece of molded plastic, preferably ABS. As shown in FIGS. 2 and 4, boot support 14 includes an elevated central structure 40 which extends from flange 38 and is strengthened by triangular wings 42a, 42b, 42c and 42d. Structure 40 includes a central opening 44 that overlies flange central opening 46 to provide space for movement of shift lever 22 during operation.

The rear portion 48 of structure 40 mounts a pair of spaced, upstanding, flexible, spring locking tangs 50 and 52 and locating pins 54 and 56. The front portion 58 of structure 40 includes a pair of spaced, upstanding shoulders 60 and 62 which mount aligned mounting pins 64 and 66.

As seen in FIGS. 2, 5 and 6, shifter housing 16 is a generally rectangular piece of molded plastic, preferably Delrin, and has a top wall 68 which incorporates a central opening 70. Depending from top wall 68 is a continuous peripheral wall comprising indented rear segment 72, inner rear side segments 74, 76, outer rear segments 78, 80, side segments 82, 84, outer front segments 86, 88, inner front segments 90, 92 and indented front segment 94. A horizontal strengthening web 96 having a rear mounting hole 98 extends between wall segments 70, 72 and 74. Similarly a horizontal strengthening web 100 having a front mounting hole 102 extends between wall segments 88, 90 and 92.

The juncture of wall segments 74 and 78 is slotted to provide a rear latch shoulder 104. Similarly, segments 72 and 76 are slotted to form a companion latch shoulder 106. Spaced pilot holes 108, 110 are formed in top wall 68 for receiving locating pins 54, 56. Circular, open-ended notches 112, 114 are formed in side wall segments 80 and 82 for receiving mounting pins 64 and 66 to initiate assembly of boot support 14 to housing 16, as will be later described.

Top central opening 70 opens into a spherical ball socket 116 formed by the inner surfaces of spaced flexible fingers 118 and 120, which depend from top wall 68. Fingers 118 and 120 are located within a chamber defined by the inner surfaces 82a and 84a of side walls 82 and 84, and the inner surfaces 72a and 94a of front and rear walls 72 and 94. Fingers 118 are identically sized and spaced, while fingers 120 are partial fingers cut away to form opposed side slots 122 and 124 in socket 116. Side wall segments 80 and 82 are cut away at notches 126 and 128 which align with slots 122 and 124. An integral spring arm 130 extends rearwardly from the front portion of side wall segment 80 through the lower portion of notch 126, as shown in FIG. 10.

Spaced pairs of circular holes 132a, 132b and 134a, 134b are formed in the front portions of side wall segments 82 and 84 and in inner front side wall segments 88 and 90, as best seen in FIG. 5. Indented rear wall segment 70 includes spaced notches 136 and 138 to form latch shoulders 136a and 138a, while indented front wall segment includes notches 140 and 142 to form latch shoulders 140a and 142a.

As best seen in FIGS. 2, 3 and 7, closure member 18 is preferably made from Acetel and has a central circular aperture 144 formed in its main body 146. A plurality of closure fingers 148 extend upwardly from main body 146 for engaging and confining the free ends of housing fingers 118 and partial fingers 120 when assembled. Pairs of spaced spring locking tangs 150 and 152 and pairs of adjacent locating fingers 154 and 156 project from main body 146. Locking fingers 158 and 160, having semicircular slots 162 and 164, extend forwardly from main body 146. The sides of main body 144 include semi-circular grooves 166 and 168.

As shown in FIGS. 1 and 2, bellcrank 20 comprises a stamped metal body having an upper arm 172 that mounts a cylindrical socket 174 for slidably receiving shifter control arm ball end 28 when assembled. The lower arm 176 of bellcrank 170 mounts a shifter cable attachment pin 178. Bellcrank 170 mounts to shifter assembly 10 by a pivot shaft 180 that includes an annular locking groove 182 adjacent its distal end to form a locking shoulder 182a. It may optionally include a second such groove adjacent its proximal end near bellcrank 170.

The assembly of shift lever assembly 12, boot support 14, shifter housing 16, housing closure 18, and bellcrank 20 to form shifter assembly 10 will now be described with particular reference to FIGS. 2, 9 and 10. Shift lever 22 is inserted through ball socket 116 and control arm 26 is slipped around the end of spring arm 140 of housing 16. Ball 24 is pushed into socket 116, spreading fingers 118 and 120. Control arm 26 extends through side slot 122 and side notch 126, atop spring arm 130.

Bellcrank 20 is mounted on housing 16 by inserting pivot shaft 180 sequentially through holes 132a, 132b and 134b and 134a, until control arm ball end 28 enters cylindrical socket 174. Closure 18 is oriented beneath housing 16 with locking fingers 158 and 160 rearward, and central circular aperture 144 around shift control member 30, as illustrated in FIG. 8.

Closure 18 is pushed on to housing 16, with locating fingers 156 engaging wall 94a and locating fingers 154 engaging wall 72a. Further pressure will deflect spring locking tangs 150 and 152 to slide through respective notches 136, 138 and 140, 142 until they lockingly engage latch shoulders 136a, 138a and 140a, 142a to secure closure 18. As assembled, closure fingers 148 engage the outsides of the free ends of housing fingers 118 and 120 to cause shifter ball 24 to be snugly embraced by socket 116. Fingers 148 are slightly flexible to accommodate manufacturing tolerances which may result in variances in the size of shifter ball 24.

Upon assembly, locking fingers 158 and 160 to embrace pivot shaft 180, with finger 160 entering shaft locking groove 182 to engage shoulder 182a and secure bellcrank 20 to housing 16. If another locking groove is included in the proximal end of shaft 180, finger 158 will likewise enter it to additionally secure bellcrank 20.

Boot support 14 is then attached by projecting shift lever 22 through central openings 44 and 46 and tilting flange 38 to engage pins 64 and 66 in notches 112 and 114, as shown in FIG. 8. Flange 38 is then pivoted downwardly to deflect the heads of spring locking tangs 50 and 52 and slide them over inner rear side wall segments 74 and 76 until locating pins 54 and 56 enter pilot holes 108 and 110. Further closing movement of boot support 14 will engage locking tangs 50 and 52 with latch shoulders 104 and 106. The engagement of tangs 50 and 52 with shoulders 104 and 106 and of pins 54 and 56 in holes 108 and 110 traps pins 64 and 66 in notches 112 and 114 and secures boot support 114 to housing 16.

The assembled shifter assembly 10 is now ready for mounting on mounting bracket 21 by applying fasteners, such as rivets (not shown), through housing mounting holes 98 and 102 and mating holes (not shown) in bracket 21. Bottom skirt 36 of shifter boot 34 can then be glued or otherwise attached to boot support flange 38 to complete the installation, as shown in FIG. 1. After vehicle installation, link 31 and pin 178 can then be attached to the ends of shifter cables (not shown), as shown in FIG. 1 of U.S. Pat. No. 4,693,135—LaRocca et al, referenced above.

In operation, lateral movement of shift lever 22 will elevate or depress control arm 26 and ball 28 to pivot bellcrank 20 about shaft 180 to operate one of the shifter cables. In the preferred embodiment of FIGS. 1–10, depression of shifter control arm 26 is resisted by spring arm 130, which centers shifter 22. Centering from elevated position in this embodiment is accomplished in the transmission.

Should centering from both elevated and depressed positions be desired, a modified housing 16' can be provided, as illustrated in FIG. 11, wherein elements like those in the preferred embodiment are indicated by like numerals primed. In this embodiment, spring arm 130' is provided to center shift lever 22 from a control arm depressed position. In addition, a second spring arm 184 is provided above control arm 26 to center shift lever 22 from elevated position.

As noted above, the shift lever assembly according to this invention is usable with or without boot support 14. In addition, housing 16 has been provided with a side slot 128 in the other side wall to accommodate a shift lever having a control arm extending from its other side. Additionally, the housing can be rotated about its vertical axis to any angle desired.

While only preferred and alternative embodiments has been illustrated and described, obvious modifications thereof are contemplated within the scope of this invention and the following claims.

We claim:

1. A manual transmission shifter comprising
a shift lever,
a ball mounting the lever,
a shift control arm projecting laterally from the ball,
a shift control member depending from the ball,
a unitary plastic housing member having
  a plurality of spaced integral resilient spring fingers contoured to form a socket intermediate their ends for receiving the ball, the fingers being interconnected only at their upper ends to define an upper opening for receiving and enabling shifting movement of the shift lever and defining an opening smaller than the ball diameter at their bottom free ends, the fingers flexing to expand the bottom opening to receive the ball and to contract thereafter to snugly embrace the ball, and
  a side slot in the housing member for receiving the shift control arm therethrough and permitting the shift control arm to move in up-and-down directions from a centered neutral position, and
a separate closure member secured to the housing member for engaging with the bottom free ends of the spring fingers to prevent expansion thereof, thereby defining the size of the socket and confining the ball therein.

2. The manual transmission shifter of claim 1, wherein the unitary housing member includes integral spring means engageable with the shift control arm to bias it against movement from the centered neutral position in one direction.

3. The manual transmission shifter of claim 1, wherein the unitary housing member includes integral spring means engageable with the shift control arm to bias it against movement from the centered neutral position in either direction.

4. The manual transmission shifter of claim 1, wherein one of the closure and housing members include latch shoulders and the other member includes integral spring tangs engageable with the latch shoulders to secure the closure member to the housing member.

5. The manual transmission shifter of claim 4, including spaced, aligned lateral mounting holes in the housing, a bellcrank pivot pin axially insertable through said holes to mount a bellcrank on the housing for operative engagement with the shift control arm, and cooperating means on the pivot pin and on the closure member for preventing removal of the pivot pin after assembly of the closure member to the housing.

6. The manual transmission shifter of claim 5, wherein the cooperating means comprise an annular groove in the pivot pin forming a locking shoulder, and a locking finger on the closure member received in the groove to abut said shoulder and prevent axial removal of the pivot pin.

7. The manual transmission shifter of claim 6, wherein the cooperating means comprise a spaced second said annular groove, said locking shoulder and said locking finger.

8. The manual transmission shifter of claim 4, including a separate boot support member for mounting a shifter boot, one of the housing and boot support members including second shoulders and the other member includes a second plurality of spring tangs engageable with second shoulders on the other member to secure the shifter boot member to the housing member.

9. The manual transmission shifter of claim 8, wherein one of the boot support and housing members include a pair of grooves and the other member includes a pair of spaced lateral mating mounting pins engageable in the grooves to locate the boot support member longitudinally on the housing member and enable relative pivotal closing movement of the members for subsequent engagement of the second plurality of spring tangs with the second latch shoulders to secure the boot support member to the housing member.

10. The manual transmission shifter of claim 9, wherein one of the boot support and housing members include a pair of locating holes and the other member includes a pair of spaced vertical mating locating pins receivable in the locating holes after said pivotal closing movement to laterally orient the members and assure engagement of the spring tangs with the second latch shoulders.

11. A manual transmission shifter comprising
a shift lever,
a ball mounting the lever,
a shift control arm projecting laterally from the ball,
a shift control member depending from the ball,
a unitary plastic housing member having

- a plurality of spaced integral resilient spring fingers contoured to form a socket intermediate their ends for receiving the ball, the fingers being interconnected only at their upper ends to define an upper opening for receiving and enabling shifting movement of the shift lever and defining an opening smaller than the ball diameter at their bottom free ends, the fingers flexing to expand the bottom opening to receive the ball and to contract thereafter to snugly embrace the ball, and
- a side slot in the housing member for receiving the shift control arm therethrough and permitting movement of the control pin, in up-and-down directions from a centered neutral position, and a separate closure member secured to the housing member for engaging with the bottom free ends of the spring fingers to prevent expansion thereof, thereby defining the size of the socket and confining the ball therein, and a plurality of cooperable interengageable locking surfaces on both members for securing the members together without the use of additional fasteners.

12. The manual transmission shifter of claim 11, wherein the plurality of cooperable interengageable locking surfaces comprise latch shoulders on the housing member and integral spring tangs on the closure member engageable with the latch shoulders to secure the closure member to the housing member.

13. The manual transmission shifter of claim 11, wherein the housing includes spaced walls flanking the spring fingers, locating abutments on the closure member for engaging the housing walls to locate the closure member on the housing to assure engagement of the spring tangs with the latch shoulders.

14. The manual transmission shifter of claim 13, including a separate boot support member for mounting a shifter boot, and a second plurality of cooperable interengageable locking surfaces on both the housing and boot support members for securing the members together without the use of additional fasteners.

15. The manual transmission shifter of claim 14, wherein the second plurality of cooperable interengageable locking surfaces include second shoulders on the housing member, a second plurality of spring tangs on the boot support member engageable with the second shoulders to secure the shifter boot member to the housing member, a pair of grooves formed in the housing member, a pair of spaced lateral mating mounting pins on the boot support member engageable in the pair of grooves to locate the boot support member longitudinally on the housing member and enable relative pivotal closing movement of the members for subsequent engagement of the second plurality of spring tangs with the second latch shoulders to secure the boot support member to the housing member, a pair of locating holes formed in the housing member, and a pair of spaced vertical mating locating holes after said pivotal closing movement to laterally orient the members and assure engagement of the spring tangs with the second latch shoulders.

16. The manual transmission shifter of claim 15, wherein the unitary housing member includes an integral spring finger engageable with the shift control arm to bias it against movement from the neutral position in one direction.

17. The manual transmission shifter of claim 15, wherein the unitary housing member includes a pair of integral spring fingers engageable with the shift control arm to bias it against movement from the centered neutral position in either direction.

18. The manual transmission shifter of claim 15, including spaced, aligned lateral mounting holes in the housing, a bellcrank pivot pin axially insertable through said holes to mount a bellcrank on the housing for operative engagement with the shift control arm, an annular groove in the pivot pin forming a locking shoulder, and a locking finger on the closure member received in the groove to abut said shoulder and prevent axial removal of the pivot pin after assembly of the closure member to the housing.

* * * * *